United States Patent [19]
Pernick et al.

[11] Patent Number: 4,892,408
[45] Date of Patent: Jan. 9, 1990

[54] REFERENCE INPUT PATTERNS FOR EVALUATION AND ALIGNMENT OF AN OPTICAL MATCHED FILTER CORRELATOR

[75] Inventors: Benjamin J. Pernick, Forest Hills; Michael A. Nowak, East Northport, both of N.Y.

[73] Assignee: Grumman Aerospace Corporation, Bethpage, N.Y.

[21] Appl. No.: 163,530

[22] Filed: Mar. 3, 1988

[51] Int. Cl.$^4$ ............................................. G01B 11/27
[52] U.S. Cl. ................................. 356/400; 356/153; 350/3.82; 350/162.13; 382/31
[58] Field of Search ................ 356/71, 152, 153, 400; 382/31; 350/3.82, 162.12, 162.13

[56] References Cited
U.S. PATENT DOCUMENTS
3,539,260  11/1970  Burch ................................ 356/400

Primary Examiner—Vincent P. McGraw
Assistant Examiner—S. A. Turner
Attorney, Agent, or Firm—Scully, Scott, Murphy & Presser

[57] ABSTRACT

Reference patterns are disclosed which are designed particularly for the functions of evaluation and alignment of an optical instrument, such as a spectrum analyzer or an optical correlator employing a matched filter array as its memory. A preferred embodiment of the reference input pattern is binary and of simple geometry such that it can be easily fabricated and the Fourier transform and autocorrelation functions can be easily calculated. Two-dimensional spectral features and autocorrelation patterns for one particular input function have been derived in closed form and numerically evaluated. The Figures herein illustrate the symmetries in the multi-peaked distributions. Tables of relative intensities are disclosed and are useful in evaluating and comparing the performance of different coherent optical processing systems.

5 Claims, 10 Drawing Sheets

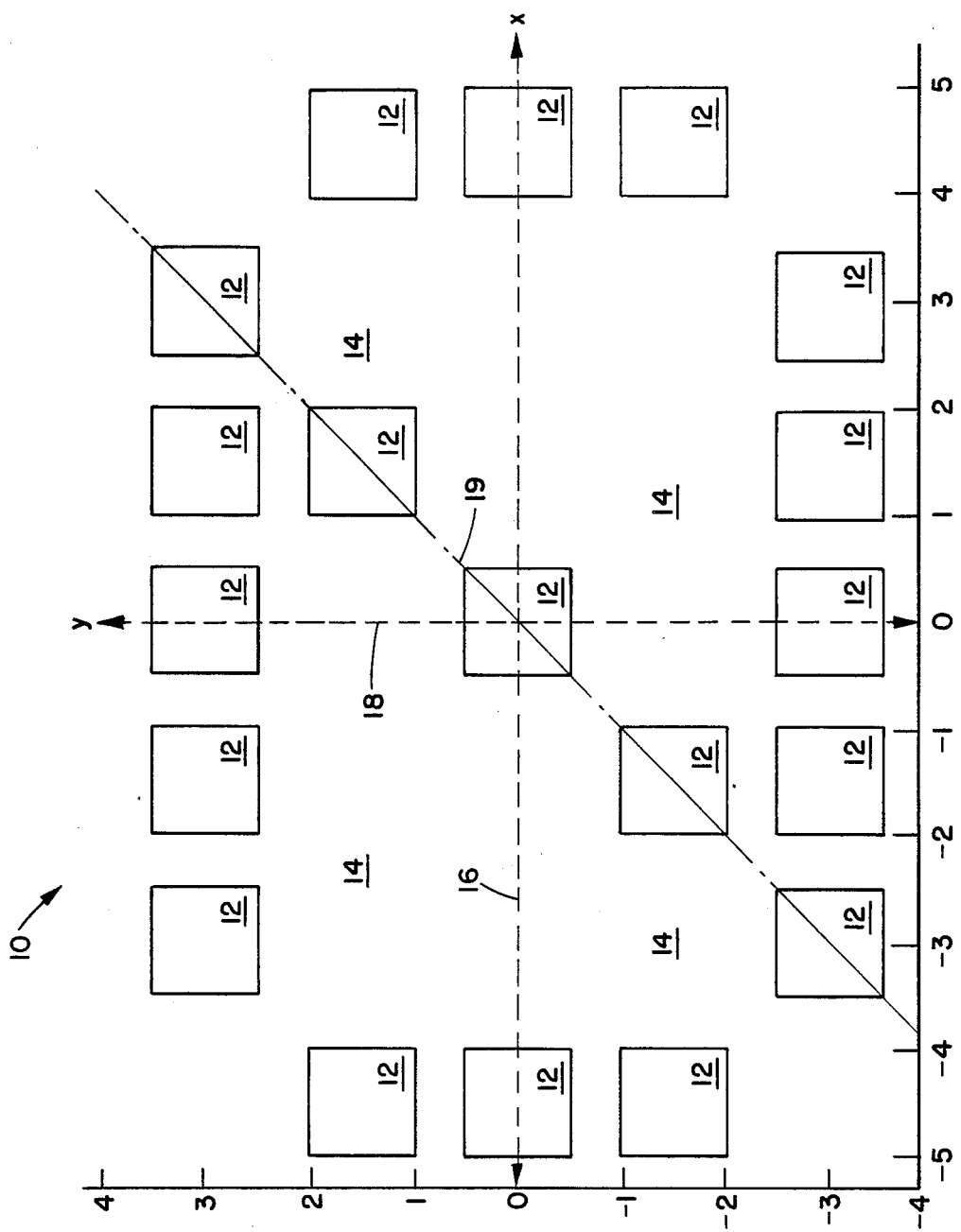
FIG.1 REFERENCE INPUT PATTERN OF CLEAR SQUARES ON AN OPAQUE BACKGROUND

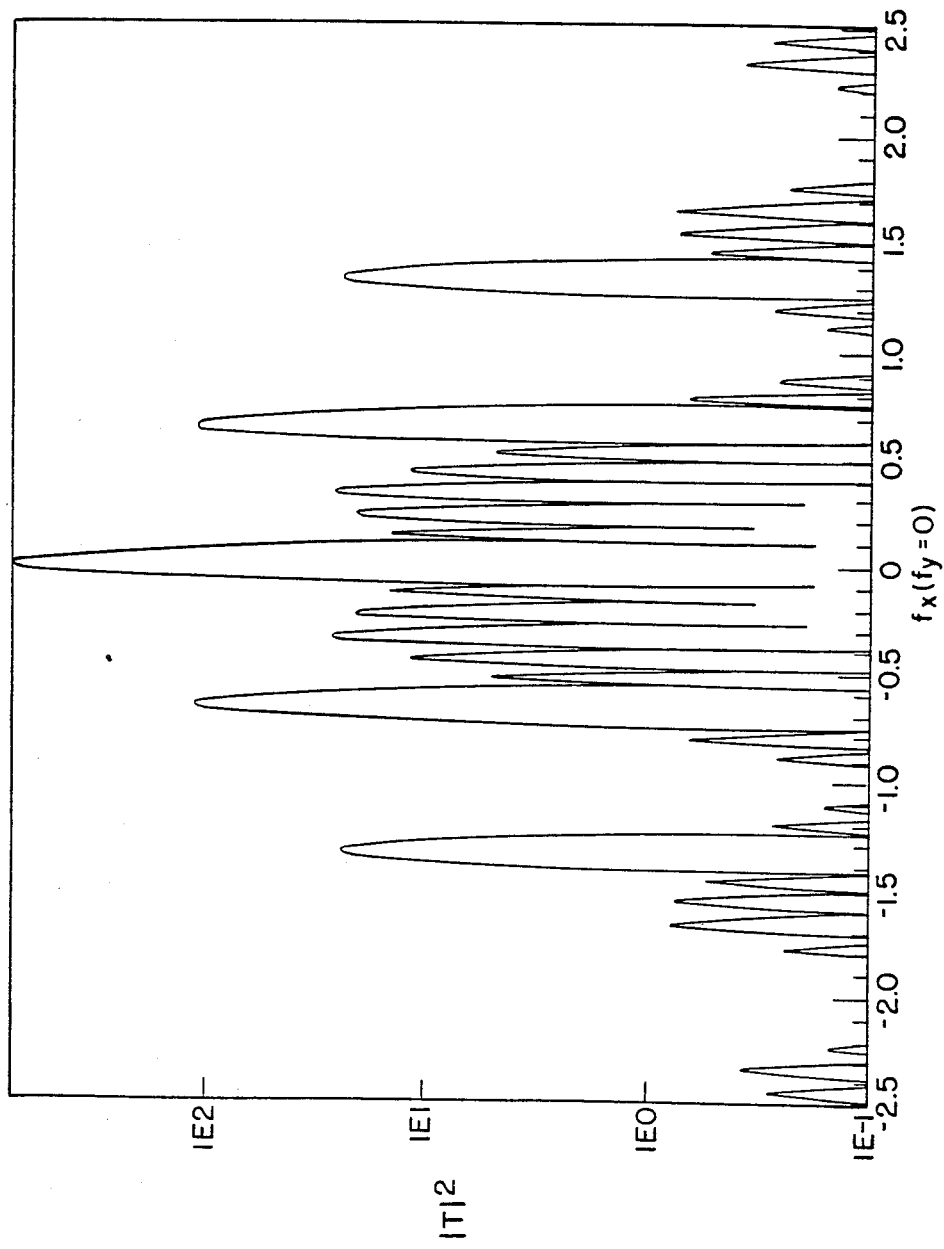
FIG. 2 POWER SPECTRAL DENSITY VARIATION WITH SPATIAL FREQUENCY, $f_x$ (FOR $f_y = 0$)

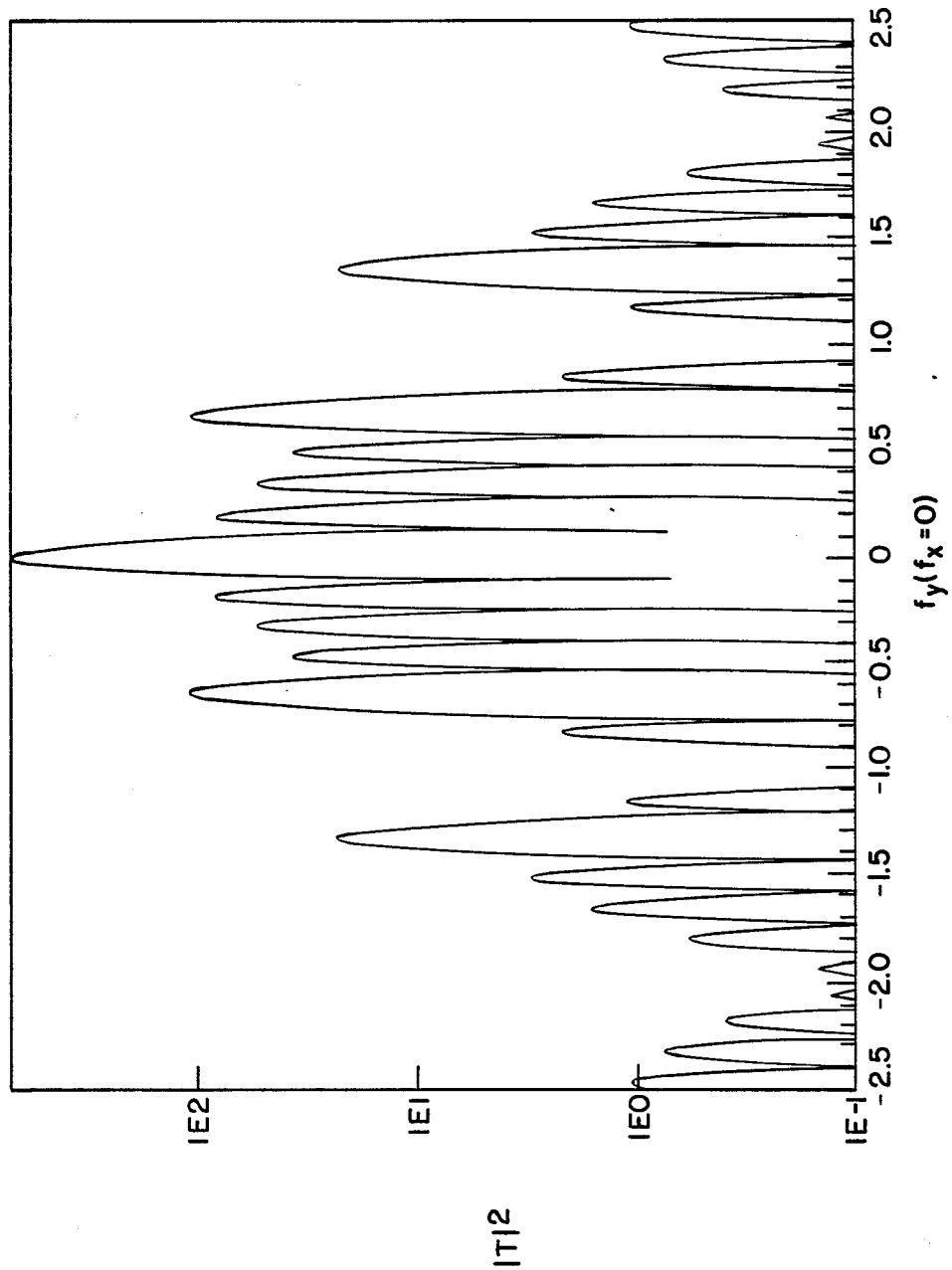
FIG. 3 POWER SPECTRAL DENSITY VARIATION WITH SPATIAL FREQUENCY, $f_y$ (FOR $f_x = 0$)

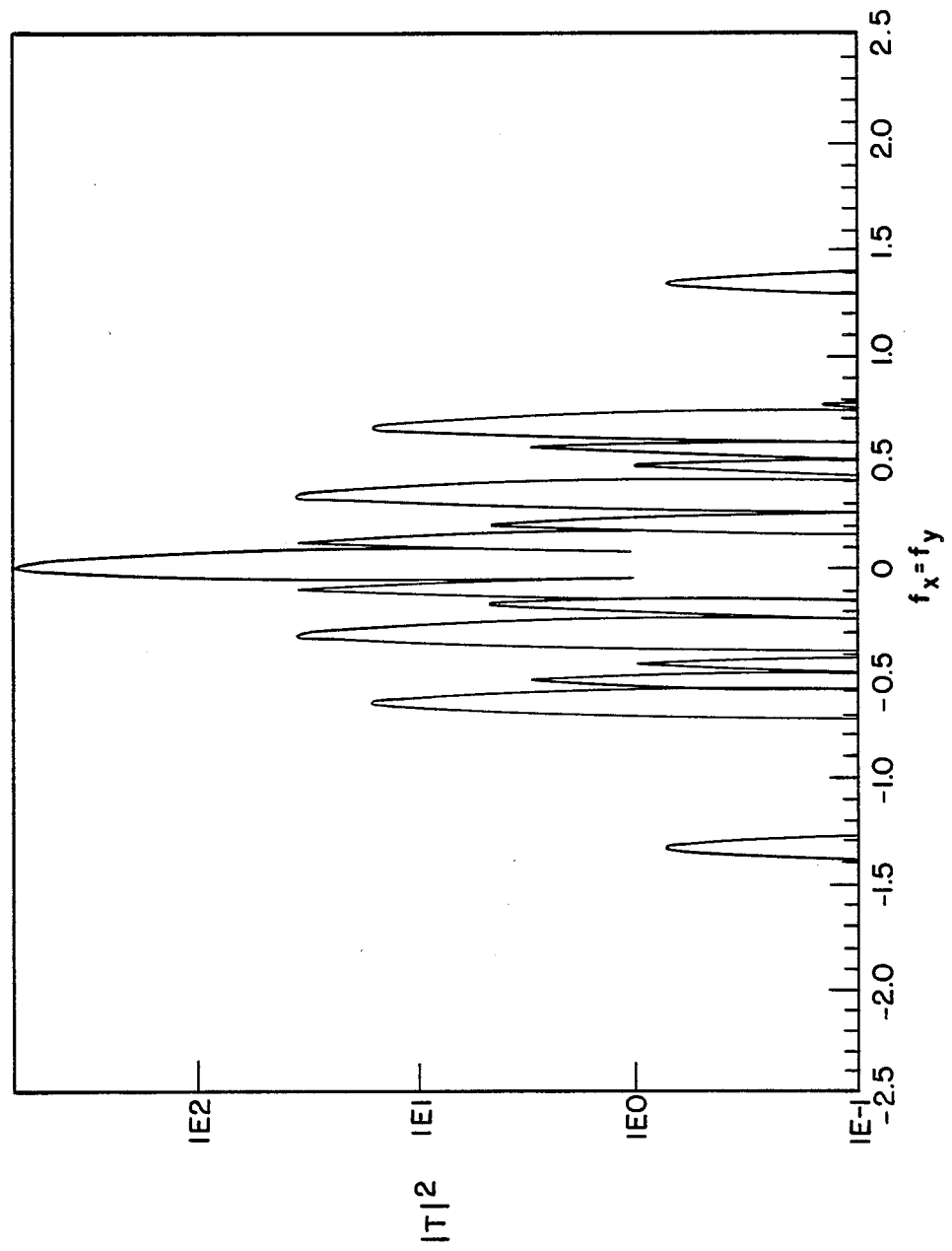
FIG.4 POWER SPECTRAL DENSITY VARIATION ALONG THE DIRECTION $f_x = f_y$

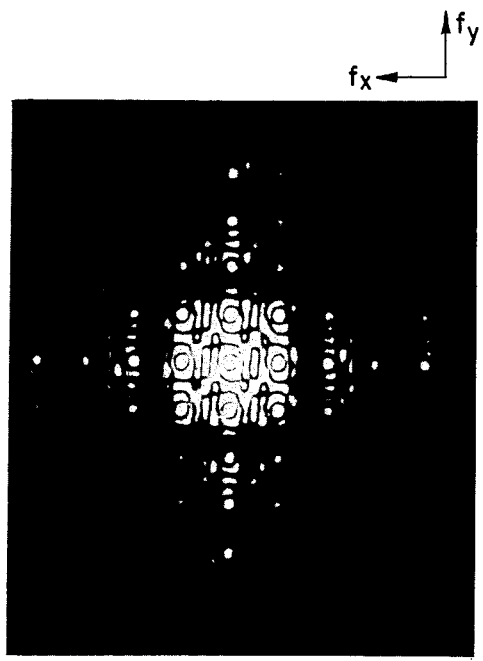
FIG. 5 DIFFRACTION PATTERN FROM A FILM RECORD OF THE REFERENCE INPUT PATTERN
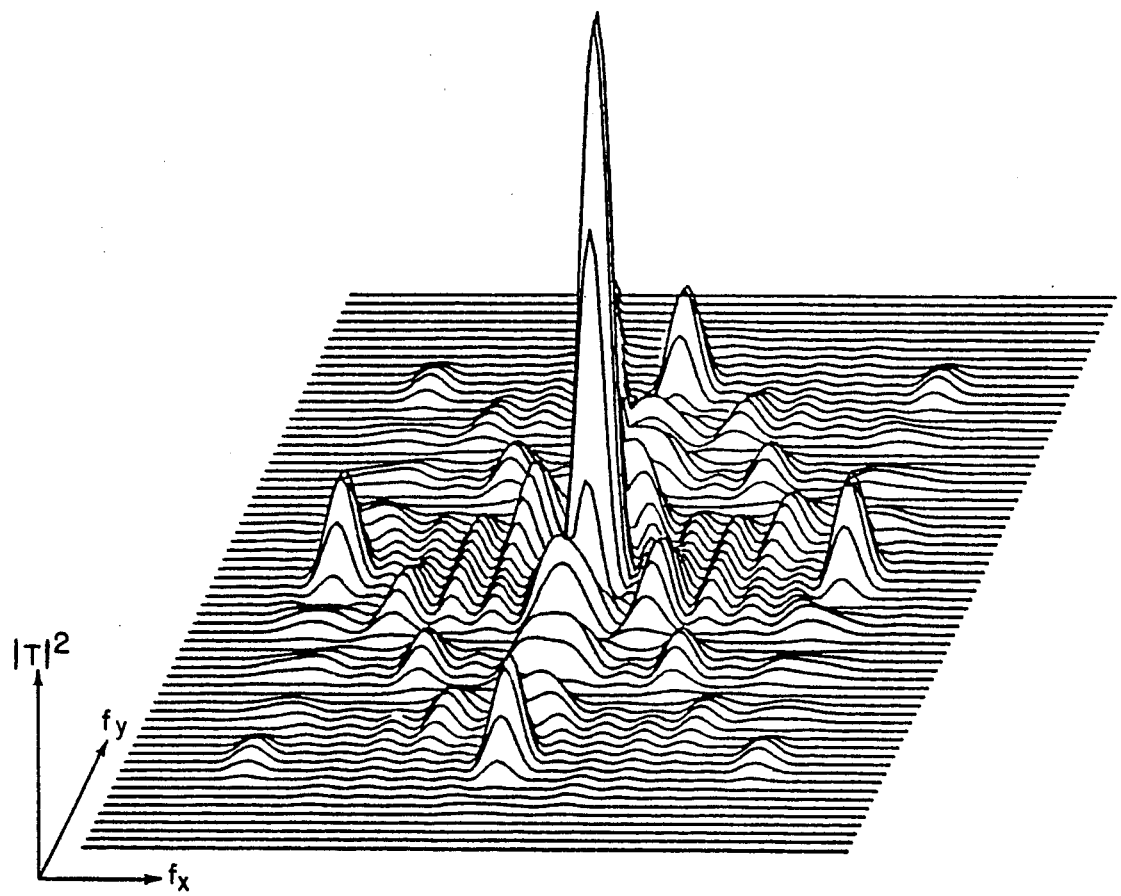
FIG. 6 COMPOSITE PLOT OF THE POWER SPECTRAL DENSITY FUNCTION WITH A 45-DEG PERSPECTIVE VIEW

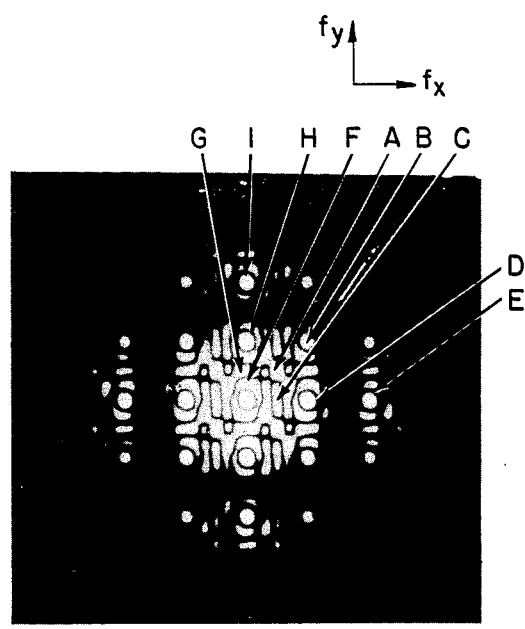
FIG. 7 LINEAR GREY SCALE SIMULATION OF THE CALCULATED 2-D DIFFRACTION PATTERN
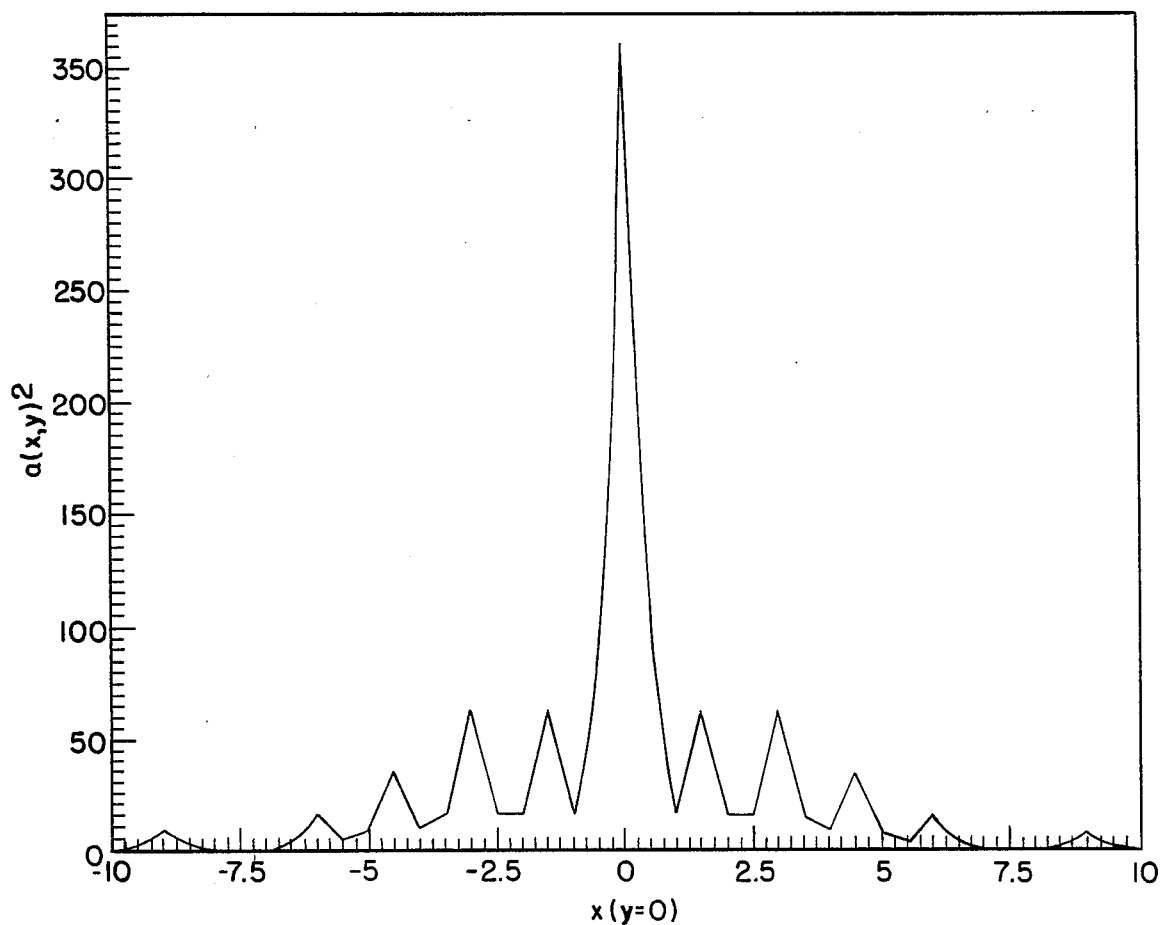
FIG. 8 SQUARED AUTOCORRELATION FUNCTION CHANGE WITH POSITION x (FOR y=0)

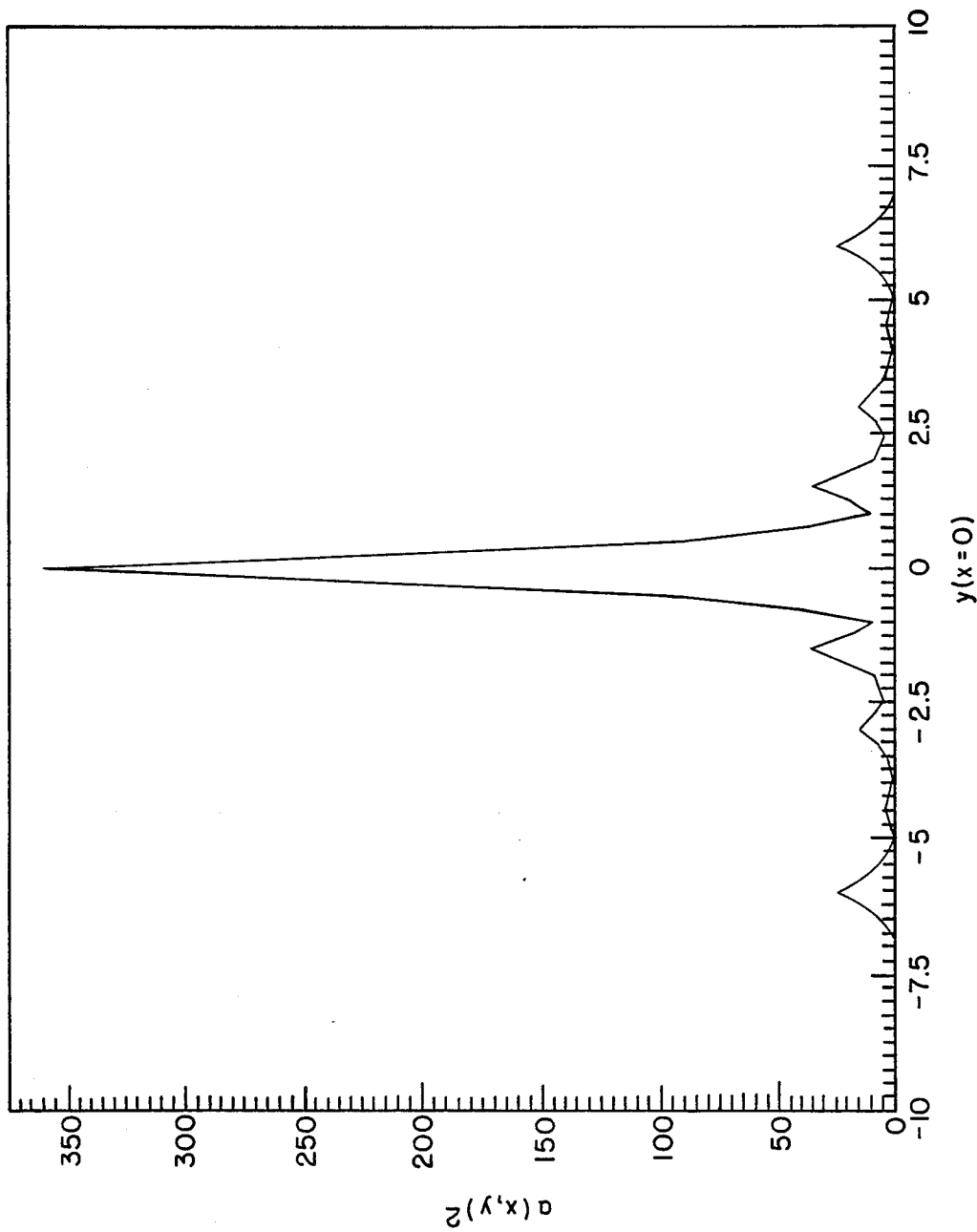
FIG.9 SQUARED AUTOCORRELATION FUNCTION CHANGE WITH POSITION y (FOR x=0)

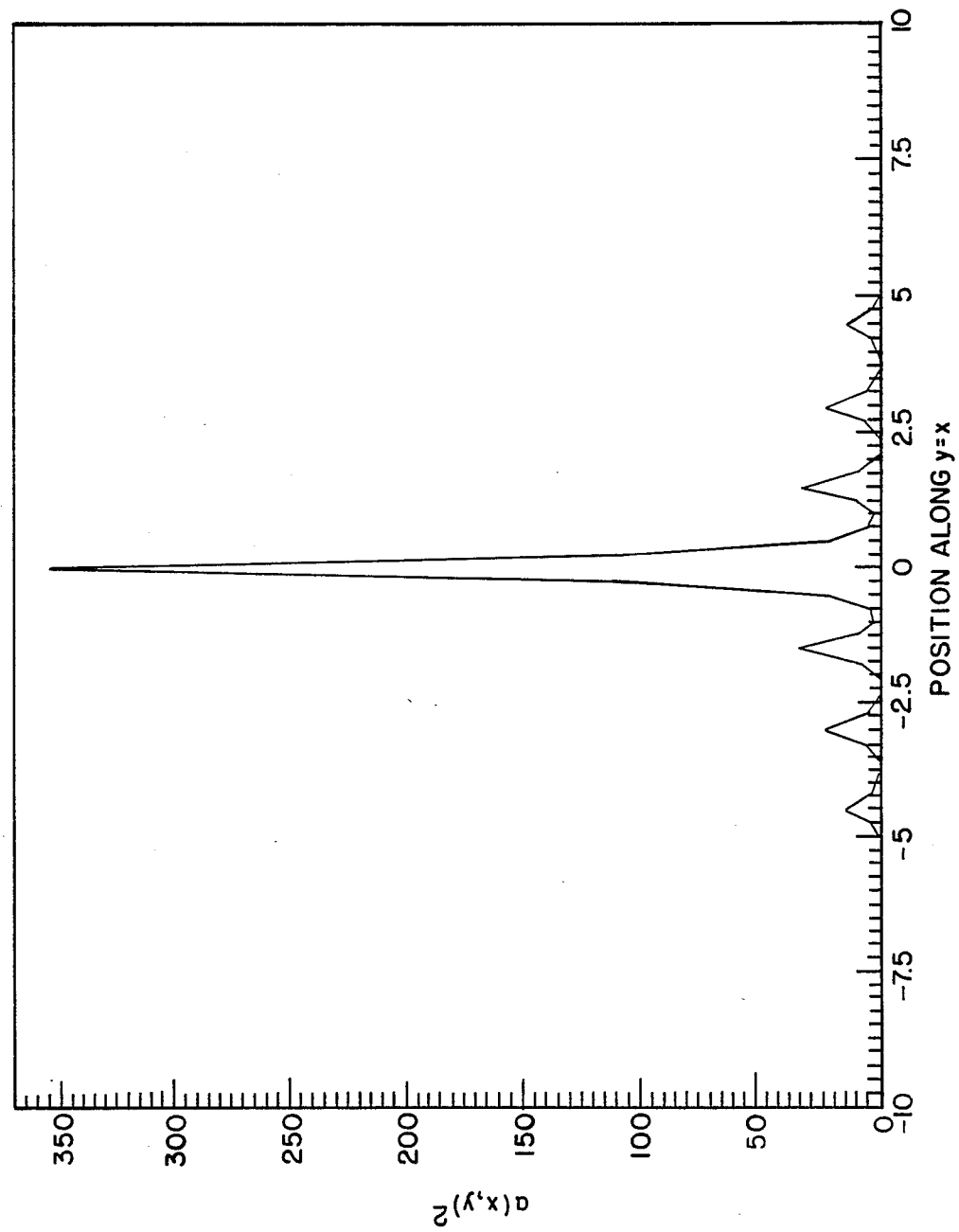
FIG.10 SQUARED AUTOCORRELATION FUNCTION CHANGE ALONG THE DIRECTION y=x

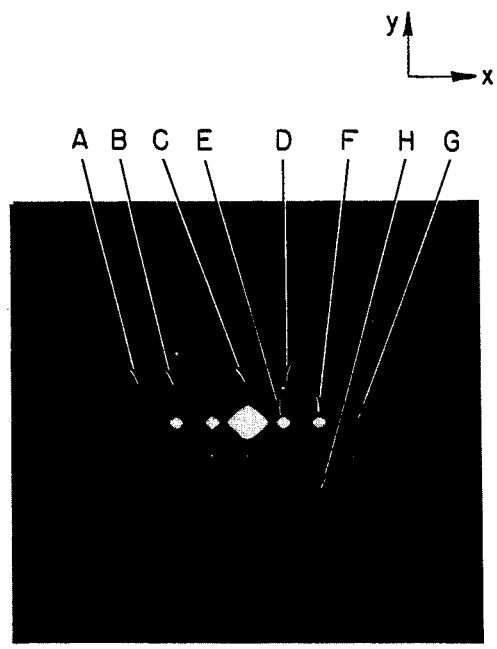
FIG. 11 LINEAR GREY SCALE SIMULATION OF THE CALCULATED 2-D AUTOCORRELATION FUNCTION
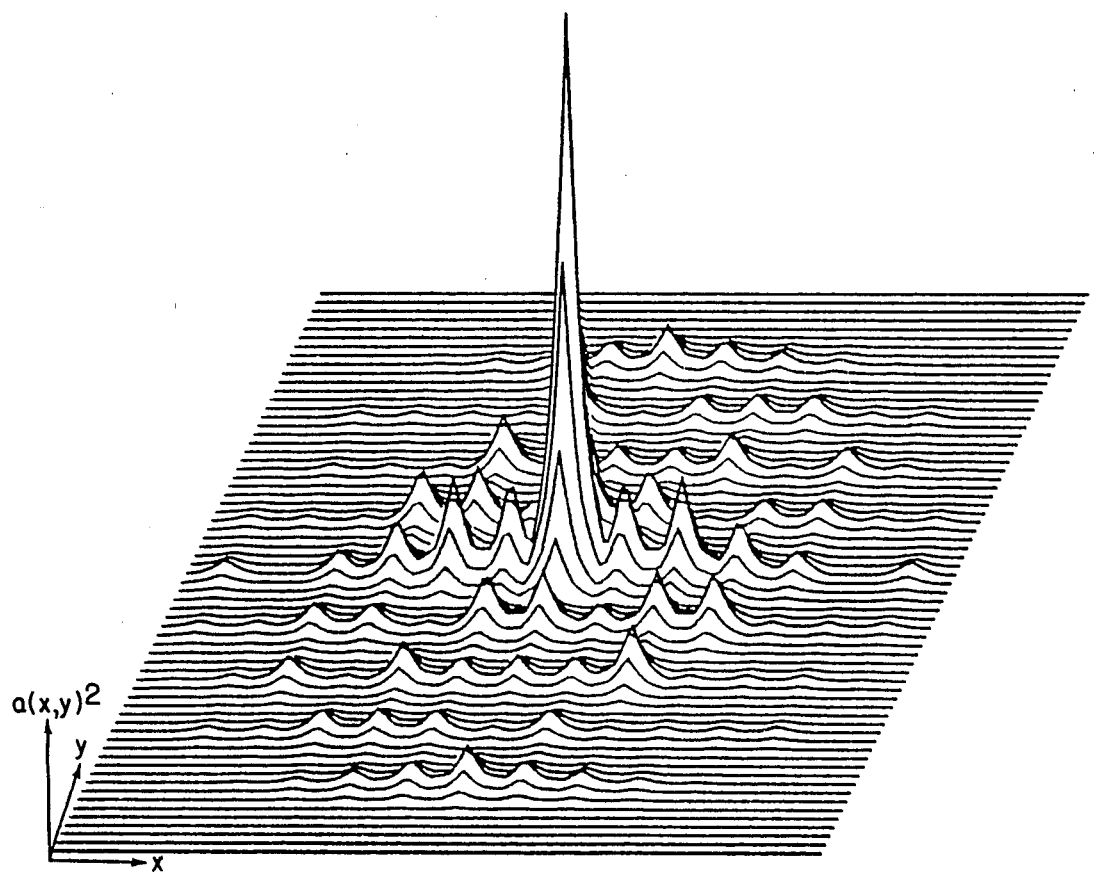
FIG. 12 COMPOSITE PLOT OF THE SQUARED AUTOCORRELATION

REFERENCE INPUT PATTERNS FOR EVALUATION AND ALIGNMENT OF AN OPTICAL MATCHED FILTER CORRELATOR

FIELD OF THE INVENTION

The present invention relates generally to reference input patterns designed particularly for the functions of alignment and evaluation of spectrum analyzers and optical correlators in general, and in particular an optical correlator employing a matched filter array as its memory. More particularly, the subject invention pertains to two dimensional transmittance patterns intended for use in the evaluation and alignment of coherent optical matched filter array correlators. The two dimensional Fourier transform distribution and autocorrelation function of one particular embodiment of this pattern are derived, and key features of these distributions are presented.

DISCUSSION OF THE PRIOR ART

An optical correlation system is disclosed in U.S. patent application Ser. No. 814,209, filed Dec. 27, 1985, relative to which the reference patterns of the present invention were developed and evaluated. The optical correlation system disclosed therein optically compares an input image with optical information stored in multiple matched filters to provide identification and aspect information about the input image. In one disclosed embodiment, the input image is directed onto a spatial light modulator to spatially modulate a coherent beam of radiation. The spatially modulated radiation beam is directed onto multiple holographic lenses which performs a multiple number of Fourier transformations thereon to obtain an array of multiple set of Fourier transforms of the spatially modulated radiation beam. A corresponding array of matched filters has the array of Fourier transforms incident thereon, with each matched filter comprising a Fourier transform hologram of an aspect view of an object of interest. Each matched filter passes an optical correlation signal in dependence upon the degree of correlation of the Fourier transform of the spatially modulated radiation beam with the Fourier transform hologram recorded thereon. An inverse Fourier transform lens receives the optical correlation outputs of the array of matched filters, and performs a Fourier transformation on each optical correlation output. A detector array then detects the inverse Fourier transform of each optical correlation output, and produces a detector output signal representative thereof. A processing circuit compares the relative magnitudes of the signals to determine identification and aspect information about the input image.

One problem with this type of optical correlator is that of obtaining and maintaining a proper and precise alignment (x, y and $\theta$ rotational) of each individual matched filter with the particular Fourier transform incident thereon generated by the multiple holographic lens.

Burch, U.S. Pat. No. 3,539,260 discloses one arrangement for the automatic alignment of coherent optical spatial frequency filters, and uses four positional reference patterns superimposed along the orthogonal axes of a target matched filter plate, and the reference patterns are alternatively processed with the target pattern in a time division multiplex arrangement. This patent permits alignment for a limited application of one matched filter, and expresses no awareness of orientation or critical alignment for arrays of matched filters, nor does the patent disclose or use complex multiple holographic lens elements. For a system such as that disclosed in U.S. Ser. No. 814,209 which employs an array of multiple matched filters and a multiple holographic lens, this prior art approach cannot be used because all outputs are derived simultaneously and matched filter movement is required.

SUMMARY OF THE INVENTION

Accordingly, it is a primary object of the present invention to provide reference input patterns designed particularly for the functions of evaluation and alignment of an optical correlator employing a matched filter array as its memory.

A further object of the subject invention is the provision of reference patterns for providing for evaluation and alignment functions in an optical correlator employing a multiple matched filter array wherein reference input pattern is binary and of simple geometry such that it can be easily fabricated and the Fourier transform and autocorrelation functions can be easily calculated.

In accordance with the teachings herein, the present invention provides a reference input pattern for evaluation and alignment of an optical correlator which optically compares an input image with optical information stored in an array of matched filters to provide identification and aspect information about the input image. An input image to be analyzed is spatially modulated onto a coherent beam of radiation, and is directed onto a multiple holographic lens which performs a multiple number of Fourier transformations thereon to obtain an array of a multiple set of Fourier transforms of the spatially modulated radiation beam.

An optical memory element has an array of matched filters recorded thereon, and the array of Fourier transforms is incident thereon, with each matched filter comprising a Fourier transform hologram of an aspect view of an object of interest and passing an optical correlation signal in dependence upon the degree of correlation of the Fourier transform of the spatially modulated radiation beam with the Fourier transform hologram recorded by the matched filter. An inverse Fourier transform lens receives the optical correlation outputs of the array of matched filters, and performs a Fourier transformation on each optical correlation output. A detector detects the inverse Fourier transform of the optical correlation outputs, and produces a detector output signal representative of the optical correlation outputs, which is then analyzed for information about the input image.

Pursuant to the teachings of the present invention, the input image is supplied by a reference input pattern providing for evaluation and alignment of the optical correlator, and comprising a two dimensional array of substantially transparent, substantially rectangular reference targets provided on a uniform dark background. The reference input pattern provides an identifiable power spectral density distribution and autocorrelation function, for evaluation and alignment of the optical correlator.

In greater detail, the two dimensional array includes a plurality of reference targets spaced along a central abscissa axis of the array and a plurality of reference targets spaced along a central ordinate axis of the array. An arrangement of this nature is relatively easy to fabricate, and also presents output signals which are relatively easy to analyze. The two dimensional array also preferably defines a plurality of reference targets spaced along a central diagonal axis intersecting said abscissa and ordinate axes. Moreover, the two dimensional array also preferably defines a plurality of reference targets spaced along the top and bottom peripheral edges of the array, and a plurality of reference targets spaced along both left and right side peripheral edges of the array.

In greater detail, in one embodiment, the alignment system is digitally controlled, as by a microprocessor or a digital sequencer, to provide in sequence an x translational alignment, a y translational alignment, and a $\theta$ angular alignment.

BRIEF DESCRIPTION OF THE DRAWINGS

The foregoing objects and advantages of the present invention for reference input patterns for evaluation and alignment of an optical matched filter correlator may be more readily understood by one skilled in the art with reference being had to the following detailed description of several preferred embodiments thereof, taken in conjunction with the accompanying drawings wherein like elements are designated by identical reference numerals throughout the several views, and in which:

FIG. 1 illustrates a first embodiment of a reference input pattern of clear squares on an opaque background;

FIG. 2 is a plot of the power spectral density variation with spatial frequency, $f_x$ (for $f_y=0$) for the reference input pattern of FIG. 1;

FIG. 3 is a plot of the power spectral density variation with spatial frequency, $f_y$ (for $f_x=0$) for the reference input pattern of FIG. 1;

FIG. 4 is a plot of the power spectral density variation along the Direction $f_x=f_y$ for the reference input pattern of FIG. 1;

FIG. 5 is a diffraction pattern from a film record of the reference input pattern of FIG. 1;

FIG. 6 is an enlarged three dimensional composite plot of the power spectral density function, shown in a 45-degree perspective view;

FIG. 7 illustrates a linear grey scale simulation of the calculated two dimensional diffraction pattern;

FIG. 8 is a plot of the squared autocorrelation function change with position x (for y=O) for the reference input pattern of FIG. 1;

FIG. 9 is a plot of the squared autocorrelation function change with position y (for x=O) for the reference input pattern of FIG. 1;

FIG. 10 is a plot of the squared autocorrelation function change along the direction y=x for the reference input pattern of FIG. 1;

FIG. 11 illustrates a linear grey scale simulation of the calculated two dimensional correlation function for the reference input pattern of FIG. 1;

FIG. 12 illustrates a three dimensional composite plot of the squared autocorrelation function for the reference input pattern of FIG. 1;

Figure 13:
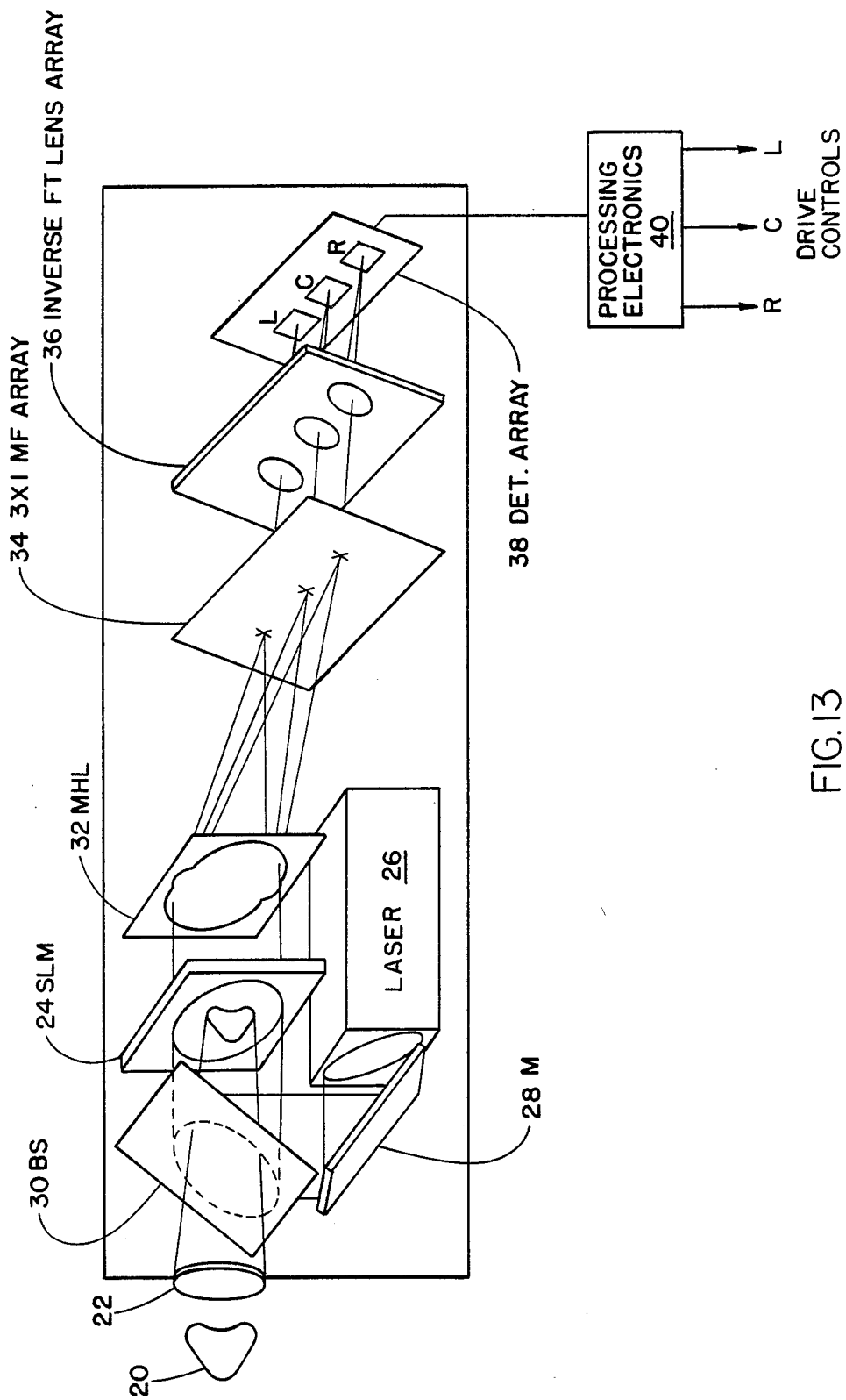
FIG. 13 is a schematic arrangement of a representative optical correlator employing a multiple holographic lens and a multiple matched filter array which can employ a reference input pattern pursuant to the present invention to evaluate the optical correlator and to align the multiple matched filter relative to the multiple holographic lens.

Table 1 lists data on the relative maxima of the power spectral density function; and Table 2 lists data on the relative maxima of the square of the autocorrelation function.

DETAILED DESCRIPTION OF THE DRAWINGS

The present invention relates to an optical correlator as is disclosed and described in U.S. patent application 814,209, filed Dec. 27, 1985, which uses a multiple holographic lens (MHL) - multiple matched filter (MMF) array.

A number of elements and concepts relating to the present invention are used frequently in this description and are essential to an understanding of its functioning and general principles of operation, and accordingly the nature and properties of several of those concepts are discussed initially hereinbelow for convenience.

An optical correlator as described herein utilizes one of several possible distributions in offset angle, position and focal length in a multiple holographic lens array to produce an array of Fourier Transforms of an input spatially modulated, laser radiation beam. In general, the particular requirements of the array will be determined by the particular application being addressed. In summary, a holographic lens takes a Fourier Transform (FT) of a laser beam illuminated scene or target, and a multiple holographic lens takes, simultaneously, a multiple set of identical Fourier Transforms. A multiple holographic lens array is usually used in conjunction with a corresponding array of matched filters.

In summary, an optical correlator as described herein uses the sensitivity of a matched filter to object rotation, or object scale size, or object orientation for target or object recognition. As either of these aspects change (i.e., the object is at a different angle than the one for which the MF is made, or at a different distance, therefore at a different scale size), the correlation signal changes.

The present invention relates primarily to a representative reference input pattern designed to accomplish several important tasks dealing with matched filter optical correlators that compare simultaneously an input image function with a plurality of image functions stored in memory in an array of matched filters. A first alignment function provides for translational and angular alignments of the matched filter array with respect to the orientation of the input image function. Secondly, in applications where relative motion of components could degrade performance, (e.g., vibration, material compliance, thermal effects, laser beam directional stability), a convenient function is provided to maintain alignment. In another application the reference input pattern function could be used as a quantitative measurement tool providing for a comparison of various correlator systems and an evaluation of matched filter designs.

The disclosure herein provides a two dimensional power spectral density distribution and the autocorrelation function of a particular exemplary reference input pattern. The reference input pattern described herein offers several features responsible for its choice. It is of a simple geometry and binary in transmittance, and consequently is easily fabricated. The two dimensional Fourier transform and autocorrelation functions can be calculated conveniently in closed form. Finally, the power spectral density distribution has favorable translation and rotation symmetries that make this reference pattern a good candidate for alignment functions.

Referring to FIG. 1, a first preferred embodiment of a reference pattern 10 consists of an array of transparent, identical rectangles 12, preferably squares on a uniform dark background 14, as illustrated in FIG. 1. The squares represent areas where the light transmittance has an assumed unit value and the dark regions are assumed to be opaque with zero transmittance. The coordinate origin relative to an abscissa 16, an ordinate 18, and a diagonal axis 19, is placed in the center of the pattern to capitalize on its symmetry properties. The two dimensional reference array includes a plurality of three reference targets spaced along the central abscissor axis 16 and a plurality of three reference targets spaced along the central ordinate axis 18 of the array. The two dimensional array also preferably defines a plurality of reference targets spaced along the central diagonal axis 19. Moreover, the two dimensional array also preferably defines a plurality of 5 reference targets spaced along each of the top and bottom peripheral edges of the array, and a plurality of three reference targets spaced along both left and right side peripheral edges of the array.

The overall appearance of the reference array is that of the number zero (0) with a diagonal line therein, as zero is commonly printed. Other slightly different reference arrays are also contemplated by the disclosure herein and the present invention. In general, the reference array should be substantially symmetrical and have a plurality of reference targets spaced along the abscissa and ordinate axes, and preferably includes reference targets spaced along the peripheral edges of the target, and can include one or more diagonally oriented lines of reference targets.

A number of different special alignment targets 12 might be used. Generally considered, they ought to be rectangular in order to provide sharp edges. An advantageous compromise is a square aperture on a black background, since it yields similar distributions of energy along the orthogonal axes. Each square is preferably of unit length and width in an arbitrary scale coordinate system. The center of the n-th square has coordinates $a_n$, $b_n$. Let $t_n$ be the transmittance function for the n-th square; thus $$t_n = \text{rect}(x - a_n) \text{rect}(y - b_n) \quad (1)$$

where $$\text{rect}(u) = 1 \text{ for } |u| < 1/2$$
$$= 0 \text{ otherwise.}$$

The complete transmittance function for the overall pattern of 19 squares is $$t = \sum_{n=1}^{19} t_n, \text{ or explicitly}$$

$$t = t(x,y) = [\text{rect}(x + 9/2) + \text{rect}(x - 9/2)][\text{rect}(y + 3/2) +$$
$$\text{rect}(y) + \text{rect}(y - 3/2)] + \{\text{rect}(y + 3) + \text{rect}(y - 3)\}\{\text{rect}(x + 3) +$$
$$\text{rect}(x + 3/2) + \text{rect}(x) + \text{rect}(x - 3/2) + \text{rect}(x - 3)\} +$$
$$[\text{rect}(x + 3/2) \text{rect}(y + 3/2)] + \{\text{rect}(x) \text{rect}(y)\} + [\text{rect}(x - 3/2) \text{rect}(y - 3/2)]$$

The autocorrelation function associated with t is $$a(x,y) = \int\int_{-\infty}^{\infty} t(\xi, \eta) \, t^*(\xi - x, \eta - y) \, d\xi d\eta \quad (3)$$

The Fourier transform of this function is $$A(f_x, f_y) = T(f_x, f_y) T^*(f_x, f_y) \quad (4)$$

where the capital letters denote transform functions and $f_x$, $f_y$ are spatial frequency variables. The transform function $A(f_x, f_y)$ is equal to the power spectral density function $T^2$. In terms of the transform of an individual square transmittance, one has $$A(f_x, f_y) = \sum_{n=1}^{19} T_n(f_x, f_y) \sum_{m=1}^{19} T^*_m(f_x, f_y) \quad (5)$$
$$= \sum_{m, n=1}^{19} T_n(f_x, f_y) T_m^*(f_x, f_y)$$

Since the Fourier transform of $\text{rect}(x - a_n)$ is $$[\sin(\pi f_x)/(\pi f_x)]\exp(-i2\pi f_x a_n), \text{ then}$$

$$T_n(f_x, f_y) = \text{sinc}(f_x)\text{sinc}(f_y)\exp[-i2\pi(a_n f_x + b_n f_y)] \quad (6)$$

The transform of the autocorrelation function becomes $$A(f_x, f_y) = \text{sinc}^2(f_x) \text{sinc}^2(f_y) \sum_{m, n=1}^{19} \exp[-i2\pi(c_{nm} f_x + d_{nm} f_y)] \quad (7)$$

$$c_{nm} = a_n - a_m, \, d_{nm} = b_n - b_m$$

The autocorrelation function itself is obtained from the inverse transform of $A(f_x, f_y)$ in Eq (7) above. Now the inverse transform of a typical term in Eq (7) is $$a_{mn}(x,y) = F^{-1}\{\text{sinc}^2(f_x) \text{sinc}^2(f_y) \exp[-i2\pi(c_{nm} f_x + d_{nm} f_y)]\} \quad (8)$$
$$= \Lambda(x - c_{nm}) \Lambda(y - d_{nm})$$

where $\Lambda$ is a triangle function with $\Lambda(x) = 1 - |x|$ for $|x| < 1$ and zero otherwise. Hence, the complete autocorrelation function becomes $$a(x,y) = \sum_{m, n=1}^{19} \Lambda(x - c_{nm}) \Lambda(y - d_{nm}) \quad (9)$$

In order to facilitate the calculation of the power spectral density as well, Eq (6) can first be simplified by utilizing the inherent symmetry of t(x,y). Aside from the pair $a_l = b_l = 0$, for each pair $a_j$, $b_j$ there exists a corresponding pair such that $a_j = -a_k$ and $b_j = -b_k$. Therefore, $T(f_x, f_y)$ can be expressed as $$T(f_x,f_y) = \text{sinc}(f_x)\text{sinc}(f_y)\left\{1 + \sum_{n=2}^{10} \exp[-i2\pi(a_n f_x + b_n f_y)] + \exp[i2\pi(a_n f_x + b_n f_y)]\right\}$$

Using the identity $\cos\theta = [\exp(i\theta) + \exp(i\theta)]/2$, this reduces to $$T(f_x,f_y) = 2\,\text{sinc}(f_x)\text{sinc}(f_y)\left\{\tfrac{1}{2} + \sum_{n=2}^{10} \cos[2\pi(a_n f_x + b_n f_y)]\right\} \quad (10a)$$

Since $T(f_x,f_y)$ is real, the expression for the power spectral density becomes $$A(f_x,f_y) = 4\,\text{sinc}^2(f_x)\text{sinc}^2(f_x)\left\{\tfrac{1}{2} + \sum_{n=2}^{10} \cos[2\pi(a_n f_x + b_n f_y)]\right\}^2 \quad (10b)$$

Programs exist and are commercially available to compute the power spectral density from Eq (10), the autocorrelation function from Eq (9). FIGS. 2 to 4 show plots of the power spectral density TT* versus spatial frequency for the reference input pattern of FIG. 1. In FIG. 2, the spatial frequency variable $f_y$ is set equal to zero, and in FIG. 3, $f_x$ is set to zero. FIG. 4 presents the power spectral density variation in the diagonal directions $f_y = f_x$.

The primary and secondary peak locations in these curves can be identified with bright regions in the optical diffraction pattern obtained from an actual film recording of the reference input pattern. FIG. 5 is a photograph of the major portion of such a diffraction pattern, and it should be realized that weak features extend beyond the edges of the film as shown. A direct correspondence between the major extrema is easily made. Note that the film response is not linear with light exposure. Hence, observed photographic exposures are at best suggestive of relative strengths in the diffraction pattern structure. In general, identification of diffraction lobe features is good.

FIG. 6 is a three dimensional plot of a set of power spectral density plots which is useful in showing overall features of the diffraction pattern such as its symmetries and relative strengths. FIG. 6 shows the power spectral density evaluated for the values $-1 \leq f_x, f_y \leq 1$, with a 45-degree perspective view. Symmetry about the origin is to be noted.

The pattern presented in FIG. 7 is a computer simulation of the two dimensional diffraction pattern in which the calculated values of log(TT*) are encoded onto a convenient linear grey scale. The principal sidelobes are identified in FIG. 7, and their computed peak intensity values relative to the center peak value, i.e., p TT*($f_x$, $f_y$)/TT*(0,0), are listed in Table 1. The similarities between these images and the experimental diffraction pattern of FIG. 5 are obvious.

TABLE 1

| Spectral Peaks Labeled in FIG. 7 | Spatial Frequency Coordinates | | Power Spectral Density TT*($f_x$,$f_y$)/TT*(0,0) |
|---|---|---|---|
| | $f_x$ | $f_y$ | |
| A | .33 | .33 | 0.064 |
| B | .66 | .66 | 0.031 |
| C | .33 | 0 | 0.047 |

TABLE 1-continued

| Spectral Peaks Labeled in FIG. 7 | Spatial Frequency Coordinates | | Power Spectral Density TT*($f_x$,$f_y$)/TT*(0,0) |
|---|---|---|---|
| | $f_x$ | $f_y$ | |
| D | .66 | 0 | 0.180 |
| E | 1.34 | 0 | 0.043 |
| F | 0 | .18 | 0.140 |
| G | 0 | .33 | 0.093 |
| H | 0 | .65 | 0.180 |
| I | 0 | 1.34 | 0.043 |

Finally, the calculated autocorrelation function is shown in subsequent figures. The associated light distribution in the correlation plane is proportional to the square of the correlation function, namely, $[a(x,y)]^2$. The squared autocorrelation function in the directions $y=0$, $x=0$, and $y=x$ are shown in FIGS. 8 to 10, respectively. The very intense central peak is the most prominent feature of these plots. A computer-simulated rendition of the logarithm of the two dimensional autocorrelation function with an encoded linear grey scale is given in FIG. 11. Several computed intensity values of the calculated autocorrelation peaks are identified in FIG. 11, and the ratio of the computed value of the peaks as compared to the central peak (i.e., a normalized squared ratio) is given in Table 2. A three dimensional plot of the calculated values is presented in FIG. 12 to illustrate relative strengths and symmetries.

TABLE 2

| Correlation Peaks Labeled in FIG. 11 | Correlation Plane Position Coordinates | | Square of the Autocorrelation Function $[a(x,y)/a(0,0)]^2$ |
|---|---|---|---|
| | x | y | |
| A | −4.5 | 1.5 | .10 |
| B | −3 | 1.5 | .10 |
| C | 0 | 1.5 | .10 |
| D | 1.5 | 1.5 | .10 |
| E | 1.5 | 0 | .18 |
| F | 3 | 0 | .18 |
| G | 4.5 | 0 | .10 |
| H | 3 | −3 | .10 |

FIG. 13 is a schematic arrangement of an optical correlator employing a multiple holographic lens and a multiple matched filter array which can employ a reference input pattern pursuant to the present invention to evaluate the optical correlator and to align the multiple matched filter relative to the multiple holographic lens. An object of interest 20 provides the input to the optical correlator, and is imaged by an input lens 22 onto a spatial light modulator (SLM) 24, which spatially modulates the image onto a laser beam from a laser 26, directed thereto by a mirror 28 and a beam splitter 30. The spatially modulated laser beam is Fourier transformed by a multiple holographic lens 32 and directed onto a corresponding array of matched filters 34. An inverse Fourier Transform lens array 36 inversely Fourier transforms the output of the matched filters and directs the outputs thereof onto a detector array 38, the output signals of which are electronically processed at 40, to produce output control signals.

The present invention can provide for the alignment of a multiple matched filter plate in an optical correlator by using a reference array of input targets, as disclosed herein. The outputs of the optical correlator, when compared with the known desired outputs, can be used to drive a stepper motor to obtain an alignment correction. One advantage of a MHL is that many lenses can be placed in the space one glass lens occupies. Lens arrays as large as 10×10 (100 lenses) can be fabricated, but more typically are 3×3, 5×5 or 6×6 arrays. The larger the MMF array, however, the more critical is the alignment problem, as each individual matched filter must be aligned in the optical correlation. While the fixed spacing provides a certain degree of automatic operation(in spacing), it does not assure proper x or y translational alignment positioning or θ rotational alignment. Accordingly, the teachings of the present invention can find direct utility in solving these critical alignment problems in alignment systems for optical correlators.

While several embodiments and variations of the present invention for a reference input pattern for an optical matched filter correlator are described in detail herein, it should be apparent that the disclosure and teachings of the present invention will suggest many alternative designs to those skilled in the art.

What is claimed is:

1. A reference input pattern providing for evaluation and alignment of an optical instrument which optically compares an input image with optical information stored in an array of a plurality of matched filters to provide identification and aspect information about the input image, wherein an input image to be analyzed is spatially modulated onto a reference beam of radiation, and is directed onto a plurality of lenses to obtain a plurality of Fourier transforms of the spatially modulated radiation beam, and an optical memory element having an array of a plurality matched filters recorded thereon, and having the plurality of Fourier transforms incident thereon, with each matched filter comprising a Fourier transform hologram of an aspect view of an object of interest and passing an optical correlation signal in dependence upon the degree of correlation of the Fourier transform of the spatially modulated radiation beam with the Fourier transform hologram recorded by the matched filter, an inverse Fourier transform lens means receiving the optical correlation outputs of the matched filters, for performing an inverse Fourier transformation on each optical correlation output, and a detector means for detecting the inverse Fourier transforms of the optical correlation outputs, and for producing detector output signals representative of the optical correlation outputs; said reference input pattern supplying said input image to the optical instrument and providing for evaluation and alignment of said optical instrument, and comprising a two dimensional array of substantially transparent reference targets provided on a uniform dark background which provides an identifiable power spectral density distribution and autocorrelation function, for evaluation and alignment of the optical instrument.

2. A reference input pattern for an optical instrument providing for evaluation and alignment of the optical instrument, as claimed in claim 1, said reference input pattern comprising a two dimensional array of substantially rectangular, transparent reference targets provided on a uniform dark background.

3. A reference input pattern for an optical instrument providing for evaluation and alignment of the optical instrument, as claimed in claim 2, said two dimensional array including a plurality of reference targets spaced along a central abscissa axis of the array and a plurality of reference targets spaced along a central ordinate axis of the array.

4. A reference input pattern for an optical instrument providing for evaluation and alignment of the optical instrument, as claimed in claim 3, further including a plurality of reference targets spaced along a central diagonal axis intersecting said abscissa and ordinate axes.

5. A reference input pattern for an optical instrument providing for evaluation and alignment of the optical instrument, as claimed in claim 4, further including a plurality of reference targets spaced along a top peripheral edge of the array, a plurality of reference targets spaced along a bottom peripheral edge of the array, and pluralities of reference targets spaced along both left and right side peripheral edges of the array.

* * * * *